US007347113B2

(12) United States Patent
De Haas

(10) Patent No.: US 7,347,113 B2
(45) Date of Patent: Mar. 25, 2008

(54) METHOD FOR EVALUATING THE FILLING RATE OF A TUBULAR ROTARY BALL MILL AND DEVICE THEREFOR

(75) Inventor: Bernard De Haas, Burdinne (BE)

(73) Assignee: Magotteaux International SA (BE)

( * ) Notice: Subject to any disclaimer, the term of this patent is extended or adjusted under 35 U.S.C. 154(b) by 553 days.

(21) Appl. No.: 10/494,513

(22) PCT Filed: Nov. 11, 2002

(86) PCT No.: PCT/EP02/12637

§ 371 (c)(1),
(2), (4) Date: May 13, 2004

(87) PCT Pub. No.: WO03/043740

PCT Pub. Date: May 30, 2003

(65) Prior Publication Data

US 2004/0256505 A1 Dec. 23, 2004

(30) Foreign Application Priority Data

Nov. 22, 2001 (BE) ................................ 2001/0758

(51) Int. Cl.
*G01M 19/00* (2006.01)

(52) U.S. Cl. .................................................... 73/865.9

(58) Field of Classification Search ............... 73/865.9; 702/113; 241/30

See application file for complete search history.

(56) References Cited

U.S. PATENT DOCUMENTS 5,698,797 A 12/1997 Fontanille et al. ............ 73/865
6,619,574 B1 * 9/2003 Fontanille et al. ............ 241/30
2003/0116663 A1 * 6/2003 Durr et al. ............... 241/46.17

FOREIGN PATENT DOCUMENTS

| | | | |
|---|---|---|---|
| DE | 1607580 | | 10/1969 |
| DE | 2117556 | | 10/1972 |
| DE | 19933995 | A1 | 3/2001 |
| FR | 2792224 | | 10/2000 |
| WO | WO93/00996 | | 1/1993 |

OTHER PUBLICATIONS

Burdett et al, Canadian Mineral Processors, Proceedings 1998, Paper No. 24, pp. 387-406, The Advanced Control Project at . . . .

Kolacz, Minerals Engineering, vol. 10, No. 12, 1997, pp. 1329-1338, Measurement System of the Mill Charge in Grinding Ball . . . .

Godler et al, Zement-Kalk-Gyps No. 4, 1994, pp. E114-E119, New Acoustic Method for Measuring the Filling Ratio of Mill Feed . . . .

* cited by examiner

*Primary Examiner*—Thomas P. Noland
(74) *Attorney, Agent, or Firm*—Fitch, Even, Tabin & Flannery

(57) ABSTRACT

The invention concerns a method which consists in establishing, by modeling, an algorithm which defines a relationship between the filling ratio of a ball mill and the angular positions of the bottom and the top of the mill content as well as of its absorbed power, in measuring, in the mill whereof the filling rate is to be determined, the angular positions of the bottom and the top of the content as well as of its absorbed power and in determining, on the basis of the measurements and algorithm, the filling rate of the mill.

10 Claims, 2 Drawing Sheets

METHOD FOR EVALUATING THE FILLING RATE OF A TUBULAR ROTARY BALL MILL AND DEVICE THEREFOR

This is a nationalization of PCT/EP02/12637 filed Nov. 11, 2002 and published in French.

BACKGROUND AND SUMMARY OF THE INVENTION

The present invention relates to a method for evaluating the filling ratio of a tubular rotary mill comprising a cylindrical barrel rotating around its longitudinal axis, the contents of which consist of a load of grinding medium made of metallic alloy and of material to be crushed which forms the pulp inside the mill as and when it is crushed, and essentially occupies, during the rotation of the mill and viewed in the rotation direction, the fourth trigonometric quarter of the section of the mill, while the bottom of the contents extends into the third trigonometric quarter and the top is raised into the first trigonometric quarter. The invention also relates to a device to be advantageously used for the implementation of this method.

The invention essentially aims at mills of the ball or rod mill type, in particular used for crushing clinker or for crushing coal and minerals.

To know the filling ratio of a mill is especially important for optimum operation of mining mills working in a wet process since the wear on the grinding medium is very heavy there and grinding medium has to be almost constantly supplied. This entails that the quantity of the medium still present in the mill should be known at any moment and that, consequently, a means for separately measuring the quantity of grinding medium and the quantity of pulp contained in the mill should be available.

It has been noted that optimum crushing conditions are obtained when the volume of the pulp approximately corresponds to the volume of the spaces between the pieces of grinding medium or slightly higher than this volume, without however exceeding it by more than 20%. When the volume of the pulp is too low, the crushing output is reduced and, in particular, the pieces of grinding medium that are in contact with each other mutually wear down. When the volume of pulp is too high, the crushing output is also reduced. To know the quantity of pulp in the mill therefore allows to adjust the supply of the mill in the most appropriate manner that corresponds to the optimum operation of the mill.

Among the many techniques currently known for determining the filling ratio of a mill in operation, none of them is completely satisfactory since they are generally either too imprecise or incomplete.

A first method consists in measuring the evolution in the power absorbed by the mill. This power absorbed by the mill increases with the filling ratio and reaches a maximum-after which it starts to decrease, in particular because of the reduced effect of unbalance. The power curve shows a very flat maximum, which considerably reduces the sensitivity of measurement as soon as the maximum is approached. Such a method is described in "Canadian Mineral Processors" Proceedings 1998, paper no. 24, Ottawa, Ontario.

A second method consists in measuring the forces exerted on the plating. An instrumented plate is placed within the plating and when it enters the load, the force exerted on the plate suddenly rises and decreases when the plate comes out of the load. This measurement is only applicable to mills provided with rubber plating and is very sensitive to the wear of the instrumented plate. Such a method is described in patent WO 93/00996.

Another method consists in measuring the deformation of the barrel of the mill given that it is subjected to radial and transverse deformations that increase as the mill is filled. The sensitivity of this measurement is reduced in the case of a low L/D ratio (length of the mill relative to its diameter) and by any rigidifying element such as an intermediate partition or great thickness of the barrel or of the plating. The principle of this measurement is described in the article "Measurement System of the Mill Charge in Grinding Ball Mill Circuits" by J. Kolacz-Mineral Engineering, Vol 10, No. 12, 1997 pp 1329-1338.

The installation of balances has also been considered in order to be able to take a direct measurement of the weight of the mill. However, this installation is quite difficult with existing mills.

Another method consists in measuring the noise generated by the impacts between the grinding medium and the plating of the mill. This noise increases with the filling ratio of grinding medium but, because the material to be crushed deadens the impacts, the noise decreases when the filling with material increases, hence the inaccuracy of measurement. In order to take these measurements, microphones have been used and placed near the barrel of the mill in order to detect the noises. This method is however affected by external noises (neighbouring mills in the crushing room) as well as by other factors such as the nature of the crushed material, the form of the grinding medium and the wear of the plating. Such a method is described in the article "New acoustic method for measuring the filling ratio of mill feed in tube mills" by F. Godler and J. Hagenbach, Zement-Kalk-Gyps No. 4/1994, pp E 114-E 119.

The German patent DE19933995A1 attempts to remedy the interference of the various noises by replacing the microphones with ultrasound sensors fixed to the barrel. These sensors measure the oscillations of the barrel where they are attached and not the noises transmitted through the air, which solves the problem of interfering noises.

Moreover, all the above-described methods have the drawback that they do not allow the separate evaluation of the filling ratio in grinding medium and the filling ratio of pulp or material to be crushed.

Measurement by wave absorption does in fact allow to distinguish the material to be crushed from the balls but it is not applicable to all types of material and presents a health risk because of X or gamma rays.

The aim of the present invention is to provide a new method and device allowing a reliable evaluation of the filling ratio that can easily be implemented on an existing mill and which can separately provide information on the grinding medium and on the pulp.

In order to achieve this objective, the present invention proposes a method of the kind described in the preamble, which is characterised in that an algorithm is established by means of a model and defines a relationship between the filling ratio of a mill on the one hand, and the angular positions of the bottom and top of the mill contents, as well as of its power absorbed on the other hand, in that the angular positions of the bottom and top of the contents are measured in the mill for which the filling ratio is to be determined, as well as its power absorbed, and in that the filling ratio of the mill is determined by means of these measurements and of the algorithm.

These measurements may be taken separately in order to determine the filling ratio of grinding medium and that of the pulp.

The angular positions of the bottom and top of the grinding load are determined by induction, whereas the angular positions of the bottom and top of the pulp are determined by conduction.

The device for implementing this method for evaluating the filling ratio of a mill comprising a barrel with inner plating is characterised in that the plating comprises at least one plate made of resin or elastomer, into which a detection system is integrated in order to detect the angular position at which the system enters the mill contents and the angular position at which the system comes out of the mill contents, in that the barrel comprises a sensor intended to generate a synchronisation signal with each turn of the mill, in that the signals generated by the detection system and the sensor are handled in an integrated processing device and sent by radio waves to a processing centre.

The detection device preferably comprises an inductive sensor for determining the angular positions of the bottom and top of the grinding load and a conductive sensor for determining the angular positions of the bottom and top of the pulp.

All the sensors are preferably duplicated and buried at different depths in the plates containing them so as to come into operation successively as and when the plates wear out.

Other features and characteristics of the invention will emerge from the detailed description of a preferred embodiment, presented below by way of illustration with reference to the attached figures in which:

DETAILED DESCRIPTION

Figure 1:
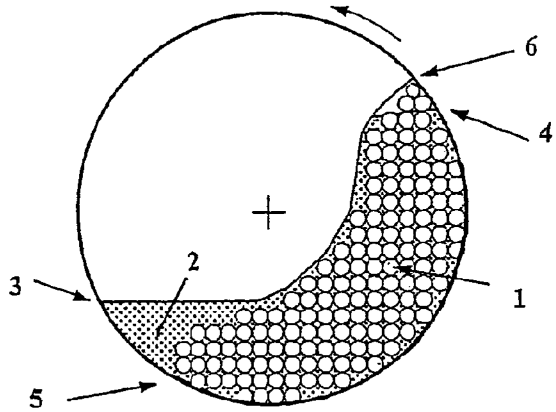
FIG. 1 diagrammatically shows a diametric section through a mill.

FIG. 1 shows a mill with a grinding load 1 composed of balls and comprising a certain quantity of material to be crushed 2, which forms the pulp. The filling of grinding balls generally corresponds to 20 to 40% of the total volume of the mill, depending on the operating conditions. The volume of the pulp for optimum operation of the mill, as defined in the introduction, approximately corresponds to the volume of the spaces between the balls or is slightly higher, without exceeding it by more than 20%.

During the rotation of the mill in the direction of the arrow on FIG. 1, the contents of the mill have the global shape in cross-section of a "pea pod" and is mainly concentrated in the fourth trigonometric quarter. The bottom 3 of the pulp and the bottom 5 of the balls, however, extend into the third trigonometric quarter, whereas the top 4 of the pulp and the top 6 of the balls are raised into the first trigonometric quarter.

Because of the different structures of the load 1 and of the pulp 2, their respective bottoms 5 and 3 and their respective tops 6 and 4 have different angular positions. Hence, the grinding load 1 is more raised than the pulp 2. The present invention, as seen below, takes advantage of these differences to separately determine the volume of the load and that of the pulp.

To this end, the invention provides sensors that release an electric signal at the moment when they enter the pulp 2 and the load 1 respectively, and another signal at the moment when they come out of them.

For the pulp, the invention has provided conductive sensors 7 and 8 by which one measures the current created by a chemical battery consisting of two masses of steel with a different composition forming electrodes which, connected to each other by a conductive medium consisting of the pulp, are the source of an electric current.

These masses of steel are integrated into a plate 9 of resin or elastomer which, for the ease of access, may be placed on the mill door.

Figure 4:
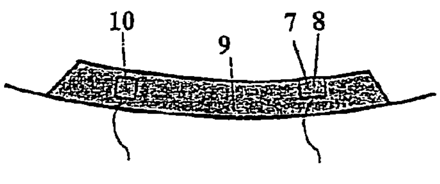
FIGS. 4 and 5 show an enlarged view in section of the plates with the sensors.
Figure 5:
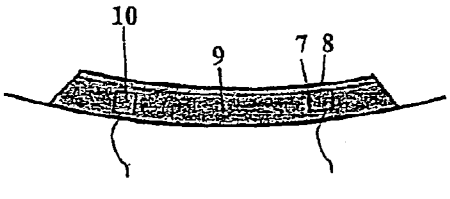

In an advantageous embodiment, a pair of sensors 7 and 8 is provided, shown on FIGS. 4 and 5 respectively. As can be seen, these sensors are buried at different depths in the elastomer plate 9. Hence, when the sensor 7, 8 at the surface on FIG. 4 is damaged by wear, the sensor 7, 8 on FIG. 5 buried in the plate 9 can take over.

When the mill is rotating, at the moment when the electrodes 7 and 8 of the sensor enter the pulp, the latter allows a current to pass between these electrodes, thereby releasing a signal, the detection of which allows to determine the angular position of the bottom 3 of the pulp. In the same way, when the electrodes 7, 8 come out of the pulp, the current is interrupted and the moment of this interruption provides information on the angular position of the top of the pulp 4.

Figure 2:
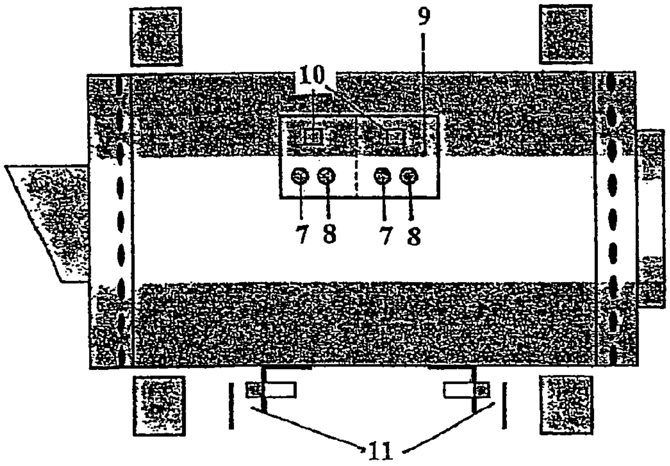
FIG. 2 is a diagrammatic view of a longitudinal section through a mill provided with the equipment proposed by the present invention.
Figure 3:
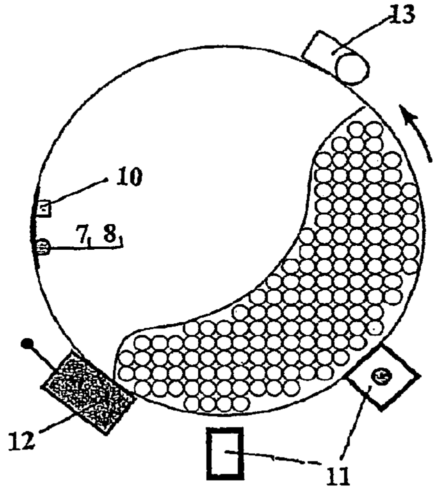
FIG. 3 diagrammatically shows a diametric section through the mill of FIG. 2.

This type of measurement may not be used for the grinding load 1 because of the discontinuous nature of this medium. In order to take this measurement, an inductive sensor 10 known per se will be used and placed in the plate 9 of the door, buried in the mass of the resin. As shown on FIGS. 2, 4 and 5, two sensors 10 will also be used here, buried at different depths in order to be able to continue with measurements when the sensor at the surface is damaged by wear.

The operation works in the same way as described above. When the mill rotates, at the moment when the inductive sensors 10 enter the load of grinding medium 1, they detect a modification of the electric field, which in turn generates a signal, the timing of which allows the bottom 5 of the load to be located. When the inductive sensors 10 come out of the load, they detect a new variation in the electric field, which allows the top 6 of the load to be located.

In order to be able to determine these angular positions, a point of reference is required. This is why a synchronisation signal is generated with every turn of the mill by a device with cells, for instance photoelectric cells, provided on the barrel and on a fixed chassis respectively and allowing to provide a reference for determining the angular positions. If this signal is the starting point and if the rotation speed of the barrel is known, the timings of the generation and end of the measurement signals provide an indication of the angular positions of the bottoms 3 and 5 and of the tops 4 and 6 relative to a reference point which may be that of the position of the synchronisation device.

The signals provided by the sensors are recorded, filtered and processed by an integrated system 12 fixed to the barrel which sends them by radio waves to a processing centre which is not shown. All of these integrated devices may be supplied by an electric generator 13 fixed to the barrel or by transmission of energy by induction.

Figure 6:
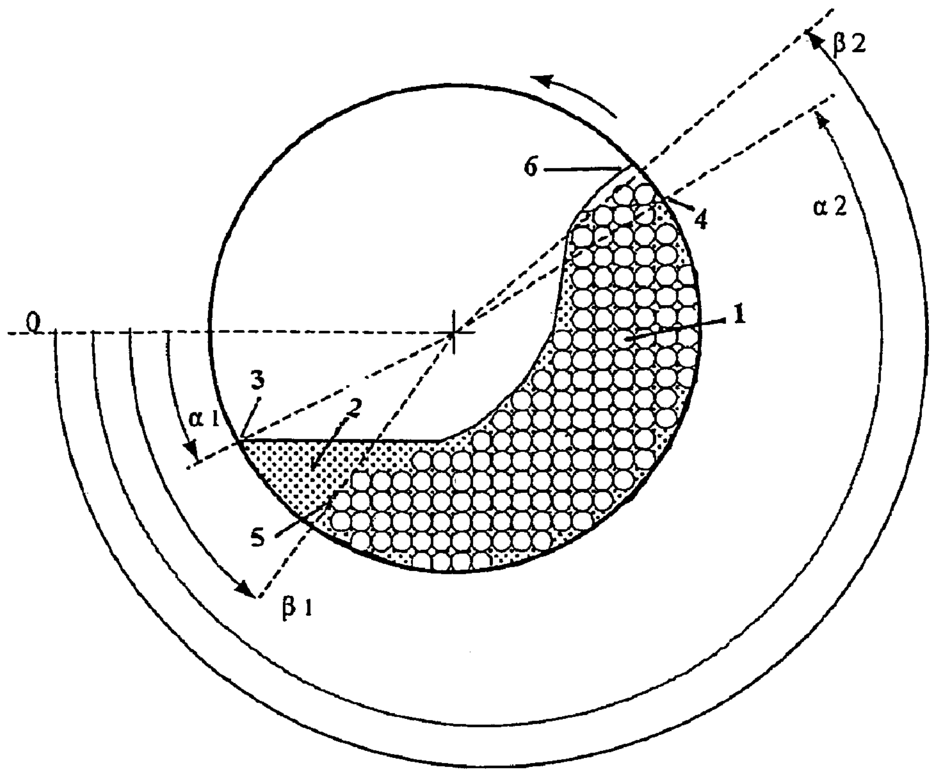
FIG. 6 is a view equivalent to that of FIG. 1 showing the details of the angular positions.

FIG. 6 diagrammatically shows the measurements provided by the sensors 7, 8 and 10. These are the angles $\alpha_1$ of the bottom 3 and $\alpha_2$ of the top 4 of the pulp respectively, as well as the angles $\beta_1$ of the bottom 5 and $\beta_2$ of the top 6 respectively of the grinding load. These angles are measured relative to a reference axis determined in this case by the synchronisation device.

In order to be able to evaluate the filling ratios of grinding load and of pulp, mathematical models are established with the following formulae:

$$J_1=a_1\alpha_1+b_1\alpha_2+c_1k.W.+d_1$$

$$J_2=a_2\beta_1+b_2\beta_2+c_2k.W.+d_2$$

where:

$J_1$ is the volume of the pulp/volume of the mill;

$J_2$ is the volume of the load/volume of the mill;

a, b, c, d are parameter coefficients;

kW is the power absorbed measured by means known per se.

These models, in particular the parameter coefficients, may be determined by empirical means by introducing into a model of a mill different known quantities of grinding load and of pulp and by measuring each time the angles $\alpha_1$, $\alpha_2$, $\beta_1$ and $\beta_2$ as well as the power absorbed.

Figure 7:
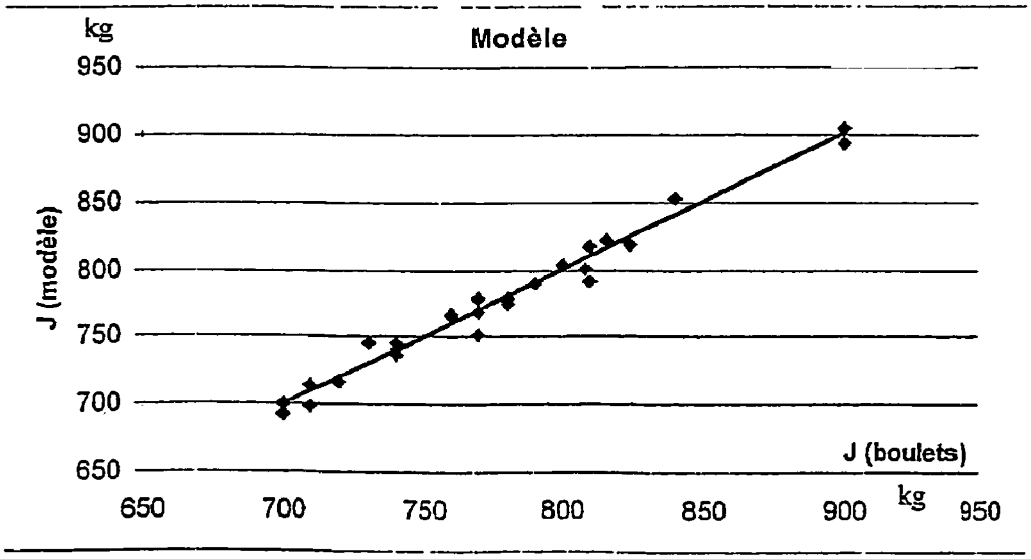
FIG. 7 shows a graph representing the correlation between the calculation according to the present invention and the actual weight of the grinding medium.

Trial runs have shown that the evaluation method proposed by the invention allows to work with great accuracy. FIG. 7 summarises the results of such trials for the evaluation of the filling ratio of grinding medium for crushing minerals.

The load for these trials was composed of balls of 40 mm and 25 mm diameter. The relative percentage of minerals to water was maintained constant and the speed of the mill was 34 revolutions per minute. The filling of balls in the mill was progressively increased from 700 kg to 900 kg by supplies of between 8 and 20 kg. The filling of the pulp was not controlled but it was the result of the changes in the process and varied between 289 and 443 kg.

The straight line on FIG. 7 represents the actual quantities of balls in the mill. The dots represent the evaluated quantities of balls obtained by means of the above-mentioned mathematical model and based on the measurement of the angles $\alpha_1$ and $\alpha_2$ as well as on the power absorbed. These trials have shown that the invention allows to evaluate the filling ratio in balls with an accuracy of the order of 98%.

In addition, the measurement of the angular positions $\alpha_1$ and $\alpha_2$ regarding the pulp provides information on the fluidity of the pulp, i.e. its water content. Indeed, the higher the fluidity of the pulp, the lower the pulp is raised, hence the smaller the angle $\alpha_2$. This knowledge also contributes to optimising the operation of the mill.

The invention claimed is:

1. Method for evaluating the filling ratio of a tubular rotary mill comprising a cylindrical barrel rotating around its longitudinal axis, the contents of which comprise a load of grinding medium made of metallic alloy and of material to be crushed which forms the pulp inside the mill as and when it is crushed, in which the contents of the mill chiefly occupy, during its rotation, and viewed in the direction of rotation, the fourth trigonometric quarter of the section of the mill, whilst the bottom of the contents extends into the third trigonometric quarter and the top is raised into the first trigonometric quarter, wherein an algorithm is established by means of a model and defines a relationship between the filling ratio of a mill on the one hand and the angular positions of the bottom and top of the contents of the mill as well as the power absorbed on the other hand, wherein the angular positions of the bottom and top of the contents are measured in the mill for which the filling ratio is to be determined as well as its absorbed power, and wherein the filling ratio of the mill is determined by means of these measurements and the algorithm.

2. Method as in claim 1, wherein the filling ratio of grinding medium and the filling ratio of pulp are separately determined.

3. Method as in claim 1, wherein the angular positions of the bottom and top of the grinding load are measured by means of an inductive sensor relative to a reference angular position.

4. Method as in claim 1, wherein the angular positions of the bottom and top of the pulp are measured by means of a conductive sensor relative to a reference angular position.

5. Method as in claim 1, wherein the algorithm is of the type: $J=a\alpha_1+b\alpha_2+ckW+d$ where:

J is the filling ratio;

$\alpha_1$ and $\alpha_2$ are the angular positions of the bottom and top of the contents;

kW is the power absorbed in kilowatts;

a, b, c, d are parameter coefficients empirically determined.

6. Method as in claim 1, wherein the rotary mill comprises a barrel with inner plating, wherein the plating comprises at least one plate made of resin or elastomer in which a detection system is integrated in order to detect the angular position at which said system enters the contents of the mill and the angular position at which said system comes out of the contents of the mill, in that the barrel comprises a sensor intended to generate a synchronisation signal with each rotation of the mill, in that the signals provided by the detection system and the sensor are handled in an integrated processing device and sent by radio waves to a processing centre.

7. Method as in claim 6, wherein the detection device is located in one access door of the mill.

8. Method as in claim 6, wherein the detection device comprises a conductive sensor for determining the angular positions of the bottom and top of the grinding load separately.

9. Method as in claim 8, wherein all sensors are duplicated and buried at different depths in the plates containing them.

10. Method as in claim 6, wherein said detection device comprises a conductive sensor for determining the angular positions of the bottom and top of the pulp separately.

* * * * *